US008792088B2

(12) United States Patent
Goering

(10) Patent No.: US 8,792,088 B2
(45) Date of Patent: Jul. 29, 2014

(54) DISTANCE-MEASURING SYSTEM

(71) Applicant: TRIMBLE Jena GmbH, Jena (DE)

(72) Inventor: Hermann Goering, Jena (DE)

(73) Assignee: TRIMBLE Jena GmbH, Jena (DE)

( * ) Notice: Subject to any disclaimer, the term of this patent is extended or adjusted under 35 U.S.C. 154(b) by 0 days.

(21) Appl. No.: 13/946,404

(22) Filed: Jul. 19, 2013

(65) Prior Publication Data
US 2013/0301029 A1   Nov. 14, 2013

Related U.S. Application Data

(60) Division of application No. 13/030,758, filed on Feb. 18, 2011, now Pat. No. 8,520,192, which is a continuation of application No. PCT/EP2008/006864, filed on Aug. 20, 2008.

(51) Int. Cl.
*G01C 3/08* (2006.01)
*G01C 3/02* (2006.01)
*G01B 11/02* (2006.01)

(52) U.S. Cl.
CPC .. *G01C 3/08* (2013.01); *G01C 3/02* (2013.01); *G01B 11/02* (2013.01)
USPC .......... 356/5.01; 356/3.01; 356/4.01; 356/5.1

(58) Field of Classification Search
CPC ............ G01C 3/08; G01C 3/02; G01B 11/00; G01B 11/02
USPC ............. 356/3.01–3.15, 4.01–4.1, 5.01–5.15, 356/6–22, 28, 28.5
See application file for complete search history.

(56) References Cited

U.S. PATENT DOCUMENTS 4,113,381 A   9/1978 Epstein
4,498,764 A   2/1985 Bölkow et al.
(Continued)

FOREIGN PATENT DOCUMENTS

EP   1 054 267 A2   11/2000
WO   99/13293 A1   3/1999
WO   2005/111541 A1   11/2005

OTHER PUBLICATIONS

Leica Geosystems AG, "Leica TPS1200+: A Telescope with New Opto-Mecahnical Design," [White Paper]; Leica Geosystems AG, Heerbrugg Switzerland, 2007, 8 pages.

(Continued)

*Primary Examiner* — Luke Ratcliffe
(74) *Attorney, Agent, or Firm* — Kilpatrick Townsend & Stockton LLP

(57) ABSTRACT

A distance-measuring system includes a light source, a light detector, and measuring optics for projecting light emitted by the light source to a target and for guiding light reflected from said target towards the light detector. The distance-measuring system also includes reference optics for guiding light emitted by the light source within the system towards the light detector as internal reference light and a variable attenuator for adjusting intensity of light incident on the light detector. The variable attenuator includes an attenuating filter arranged in a beam path between the measuring optics and the light detector and an actuator coupled to the attenuating filter for moving the attenuating filter. The distance-measuring system further includes an optical selector coupled to at least one of the actuator or the attenuating filter and moved by the actuator together with the attenuating filter.

14 Claims, 13 Drawing Sheets

(56) References Cited

U.S. PATENT DOCUMENTS

| | | |
|---|---|---|
| 4,699,508 A | 10/1987 | Bolkow et al. |
| 5,241,360 A | 8/1993 | Key et al. |
| 5,815,251 A | 9/1998 | Ehbets et al. |
| 6,226,076 B1 | 5/2001 | Yoshida |
| 6,384,904 B1 * | 5/2002 | Ohishi et al. ............... 356/5.13 |
| 6,765,653 B2 | 7/2004 | Shirai et al. |
| 8,520,192 B2 | 8/2013 | Goering |
| 2004/0246461 A1 | 12/2004 | Ohtomo et al. |
| 2008/0297759 A1 | 12/2008 | Skultety-Betz et al. |

OTHER PUBLICATIONS

International Search Report and Written Opinion of PCT Application No. PCT/EP2008/006864, mailed Jun. 12, 2009, 14 pages.

Non-Final Office Action of Dec. 7, 2012 for U.S. Appl. No. 13/030,758, 9 pages.

Notice of Allowance of Apr. 29, 2013 for U.S. Appl. No. 13/030,758, 10 pages.

* cited by examiner

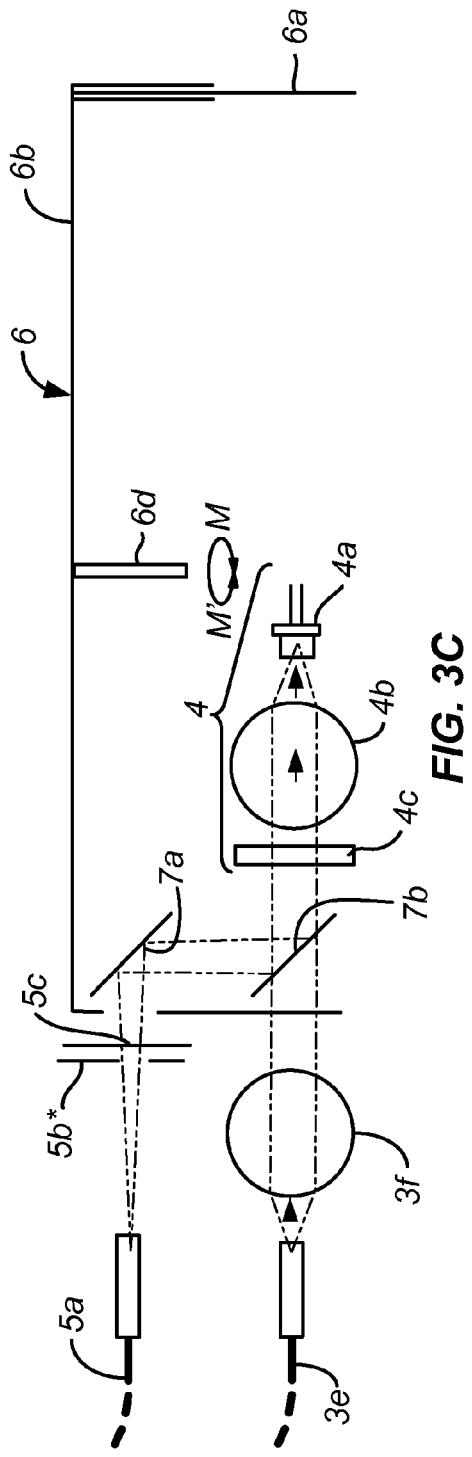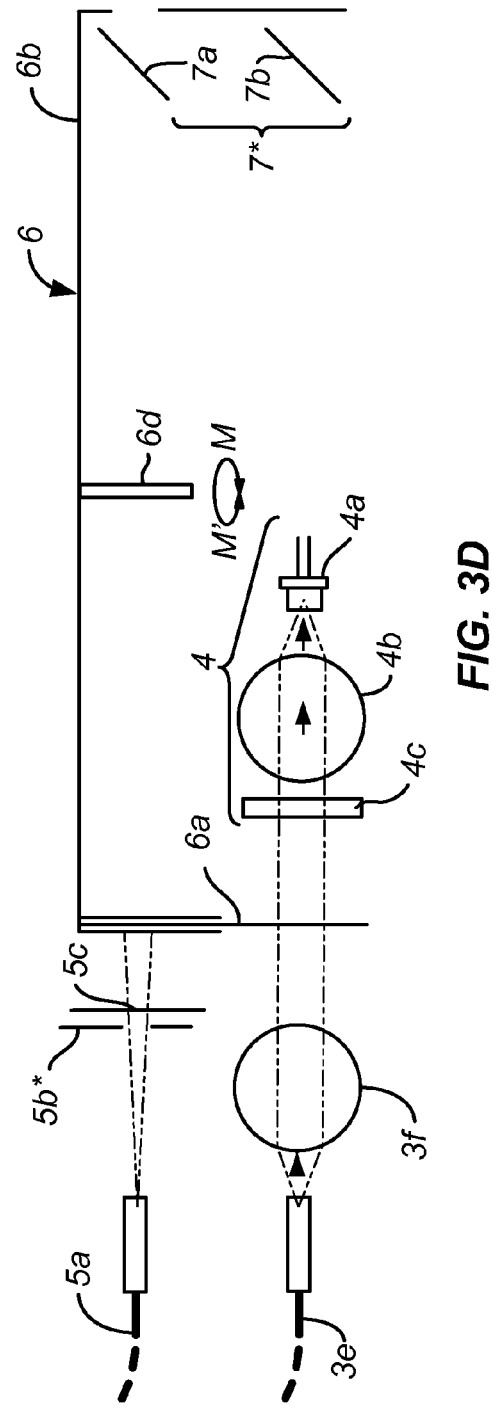

DISTANCE-MEASURING SYSTEM

CROSS-REFERENCES TO RELATED APPLICATIONS

This application is a divisional of U.S. application Ser. No. 13/030,758, filed Feb. 18, 2011, which claims priority to and is a continuation of International Patent Application No. PCT/EP2008/006864, filed on Aug. 20, 2008, the disclosures of which are hereby incorporated by reference in their entirety for all purposes.

BACKGROUND OF THE INVENTION

The present invention relates to a distance-measuring system capable of measuring a distance of a target from the system in an optical way, and, more particularly, to a compact, lightweight and cheap structure of such a system.

For determining the distance of a target from the distance-measuring system a variety of technologies are available. These technologies usually involve emitting some type of radiation (e.g. light, supersonic and radar) towards the target and receiving a portion of the radiation reflected back from the target. The distance from the system to the target is determined by one of several approaches well known by the skilled person; detailed description is therefore omitted. Some examples are described in prior art documents U.S. Pat. No. 4,113,381, U.S. Pat. No. 5,241,360, U.S. Pat. No. 6,765,653 or US 2004/0246461. For example, some systems calculate the distance from the system to the target by determining a phase difference between radiation emitted to the target and reflected radiation received from the target, while other systems measure a time delay between emission of the radiation to the target and receipt of the reflected radiation at the system. For example, measurement of distance can be accomplished by emitting a modulated microwave or infrared carrier signal to the target that is reflected by the target. The distance can then be determined, for example, by emitting and receiving multiple frequencies, and determining the integer number of wavelengths to the target for each frequency.

Such systems according to the above prior art, which use light as radiation, usually comprise a light source, a light detector and measuring optics for projecting light emitted by the light source to the target and for guiding light reflected from the target back towards the light detector.

The target can be a so-called non-cooperative target having comparatively low reflectivity (e.g. a wall of a building, a stone, a tree, or other environmental object), or a so-called cooperative target having comparatively high reflectivity (e.g. a prism or reflector). To adapt the light detector to varying intensities of reflected light that is received from different targets, the system often further comprises a variable attenuator for adjusting the intensity of light incident on the light detector.

BRIEF SUMMARY OF THE INVENTION

Embodiments of the invention are directed to a distance-measuring system having an especially compact and lightweight structure that can be manufactured at low cost while maintaining a high degree of accuracy. Further embodiments of the invention are directed to a distance-measuring system and method providing an increased measuring speed.

According to embodiments, a distance-measuring system comprises a light source, a light detector, measuring optics and a variable attenuator. According to embodiments, the distance-measuring system further comprises reference optics and an optical selector.

The light source can be, for example, a laser or Light Emitting Diode (LED) for emitting visible light or infrared light. The light can be, for example, pulse modulated, or modulated and especially comprise a carrier signal.

The light detector can be any light sensitive element capable of sensing light, especially, a semiconductor element. The light detector can be, for example, a photodiode and especially an avalanche photodiode.

The measuring optics is configured to project light emitted by the light source to a target to be measured and to direct light reflected from the target towards the light detector.

The reference optics is configured to direct light emitted by the light source within the system towards the light detector as an internal reference light. Thus, the internal reference light directed by the reference optics travels a predetermined distance from the light source to the light detector without leaving the system. This internal reference light is used to calibrate measurement of the system and thus to increase accuracy of the system.

The measuring optics and reference optics, for example, can each comprise several optical lenses, deflecting elements, filters and optical fibers.

The variable attenuator comprises an attenuating filter arranged in a beam path between the measuring optics and the light detector, a carrier supporting the attenuating filter, and an actuator coupled to the carrier for moving the carrier together with the attenuating filter. Thus, the variable attenuator is configured to adjust the intensity of light incident on the light detector. The attenuating filter can for example be a density filter and especially a neutral density filter and further especially a grey-wedge filter. Furthermore, it is emphasized that the carrier and the attenuating filter of the variable attenuator for example can either be separate elements or be made in one piece.

The optical selector is configured to selectively direct light directed by either the measuring optics or the reference optics to the light detector.

According to a first embodiment, the optical selector is coupled to at least one of the actuator and the attenuating filter, and thus moved by the actuator together with the attenuating filter. According to embodiments, the optical selector is supported by the carrier of the variable attenuator together with the attenuating filter and moved by the actuator together with the carrier. Thus, one single actuator (e.g. motor) is sufficient to move both the attenuating filter of the variable attenuator and the optical selector. As a separate actuator for the optical selector can be avoided, the system has an especially compact and lightweight structure and low manufacturing cost.

According to a second embodiment (that can be combined with the above first embodiment), the attenuating filter of the variable attenuator has first and second sections of varying transmissivity along the same direction of movement caused by the actuator. Thus, along the direction of movement of the attenuating filter, the first and second sections are arranged in succession. Transmissivity varies in each the first and second section either from higher transparency to lower transparency or from lower transparency to higher transparency. In other words, along the same direction of movement of the attenuating filter caused by the actuator, transparency of the attenuating filter has at least two maximum values and at least two minimum values. Use of the attenuating filter having at least two sections of varying transmissivity has the advantage that one of these sections can be used for measurement of non-cooperative targets and the other section can be used for measurement of cooperative targets.

According to embodiments, a maximum value of transparency of the first section of the attenuating filter of the variable attenuator is arranged neighboring in sequence to a minimum value of transparency of the second section of the attenuating filter, and a minimum value of transparency of the first section is arranged neighboring in sequence to a maximum value of transparency of the second section. For example, the first and second sections can be part of an endless loop (which endless loop can be interrupted by the selector, for example). If measurement is started with a positioning of the attenuating filter such that the beam path between the measuring optics and the light detector is arranged between the two sections of the attenuating filter, both the maximum value of transparency (that is favorable for starting measurement of non-cooperative targets) and the minimum value of transparency (that is favorable for starting measurement of cooperative targets) can be reached very quickly by moving the attenuating filter by only a small amount. Consequently, the time necessary for performing a measurement is significantly decreased. Furthermore, use of a slower actuator for moving the variable attenuator is possible, thus reducing manufacturing costs.

According to embodiments, the optical selector is arranged between the first and second sections of the attenuating filter of the variable attenuator. If measurement is started with a positioning of the attenuating filter such that the beam path between the measuring optics and the light detector is arranged where the two sections of the attenuating filter neighbor each other, the optical selector interrupts the beam path between the measuring optics and the light detector and can be arranged in a beam path between the reference optics and the light detector when measurement is started. Therefore, the optical selector can selectively direct internal reference light received from the reference optics towards the light detector when measurement is started. From this starting position a suitable attenuation of the attenuating filter can also be reached during measurement for both cooperative and non-cooperative targets very quickly. Thus, calibration of the system can be performed at the beginning of each measurement without causing a significant time delay.

According to embodiments, the attenuating filter of the variable attenuator defines the surface of a flat disc, wherein the two sections of varying transmissivity form sectors of the disc. The optical selector is arranged at a position of the disc where a minimum value of transparency of one section of varying transmissivity is arranged neighboring in sequence to a maximum value of transparency of another section of varying transmissivity of the attenuating filter. The attenuating filter can, for example, be directly mounted to the optical selector. Alternatively, a carrier of the variable attenuator can, for example, be provided for mounting the optical selector. The carrier and the attenuating filter of the variable attenuator can also be formed in one piece, for example, by providing the disc with a central shaft.

According to a third embodiment (that can be combined with at least one of the above first and second embodiments), the carrier of the variable attenuator has a circular shape rotatable about a central rotational shaft. The rotational shaft is coupled to the actuator for rotating the carrier. The circular shape can, for example, be the shape of a disc or wheel. Further, the attenuating filter of the variable attenuator is part of a circumferential surface when supported by the carrier. Examples of such circumferential surfaces are a cylinder-surface, a frusto-conical surface, or a peripheral surface of an annular ring. Variations or combinations of the above types of surfaces are possible. Furthermore, the present invention is not limited to the listed examples of circumferential surfaces.

For example, the attenuating filter of the variable attenuator can be part of a surface of revolution, such as e.g. a lateral surface of a rotational solid.

Use of an attenuating filter defining a circumferential surface when supported by the carrier has the advantage that the attenuating filter has a large extension along the same direction of movement of the carrier (and thus even the attenuating filter) caused by the actuator while a compact structure of the variable attenuator as a whole is maintained. Furthermore, the attenuating filter forms an endless loop. This endless loop needs not to be continuous, but can be interrupted by the selector, for example.

According to further embodiments, the detector is arranged within the circumferential surface defined by the attenuating filter. By arranging the detector inside this circumferential surface, the system has an especially compact structure. According to embodiments, even the actuator of the variable attenuator or further components of the distance-measuring system are arranged within this circumferential surface defined by the attenuating filter.

According to embodiments, the first and second sections of varying transmissivity of the attenuating filter extend in a circumferential direction of the circumferential surface defined by the attenuating filter. This circumferential direction corresponds to the direction of movement of the carrier (and thus also to the direction of movement of the attenuating filter) caused by the actuator.

According to embodiments, the beam path between the reference optics and the light detector enters the circumferential surface defined by the attenuating filter in an area closer to the carrier of the variable attenuator than the beam path between the measuring optics and the light detector.

According to further embodiments the optical selector causes parallel displacement of beams entering and leaving the optical selector. Alternatively, or additionally, the optical selector is configured such that light incident on the optical selector, and light emitted by the optical selector is oriented orthogonal to a direction of movement of the optical selector when the actuator moves the carrier and thus also the selector.

According to embodiments, the optical selector has first and second mirror surfaces, the first mirror surface can be arranged in an optical axis defined by the reference optics, and the second mirror surface can be arranged at the same time in an optical axis defined by the detector. Position of the first and second mirror surfaces can be changed by moving the optical selector together with the variable attenuator by using the actuator. In this respect, the optical selector can be a prism, especially a rhomboid prism, for example. In this case it has some advantages if the prism is oriented such that a beam path between the first and second mirror surfaces of the prism is oriented parallel to an axis of rotation of a rotational shaft of the carrier. Alternatively, or additionally, the beam path between the first and second mirror surfaces of the prism can be, for example, oriented orthogonal to the carrier of the variable attenuator.

According to further embodiments, the system further comprises a second light source for emitting an adjustment light that can be directed through the measuring optics. The second light source can be, for example, a lamp, a bulb, a laser or Light Emitting Diode (LED) for emitting visible light. By use of such a second light source, adjustment of the measuring optics can be performed in an especially easy way as the measurement optics can be illuminated from a position close to the light detector from inside the system. Thus, the light emitted by the second light source passes trough the measuring optics in a direction opposite to the direction that is used when distance measurement of the target is performed.

According to embodiments, the optical selector comprises an external reflecting surface for directing the adjustment light towards the measuring optics. Thus, the optical selector can not only be used to selectively direct light directed by either the measuring optics or the reference optics to the light detector, but even to selectively direct light emitted by the second light source to the measuring optics.

According to embodiments, a ball lens arranged adjacent the light detector is further provided. According to further embodiments, the measuring optics comprises an optical fiber and a ball lens arranged adjacent to the optical fiber, wherein the attenuating filter can be arranged between the ball lens of the measuring optics and the ball lens of the light detector by operating the variable attenuator. Use of ball lenses before and after the attenuating filter of the variable attenuator with respect to a beam path passing through the attenuating filter has the advantage that the beams of light passing through the attenuating filter are oriented substantially parallel. Furthermore, ball lenses frequently need no calibration as ball lenses can be self-setting e.g., by using lens holders having only four points of support. Moreover, ball lenses are comparatively cheap, thus further reducing manufacturing costs. However, other lenses than ball lenses can, for example, be used in all embodiments.

According to embodiments, the reference optics comprises an optical fiber coupled to the light source, and the optical selector can be arranged between the optical fiber of the reference optics and the ball lens adjacent the light detector by operating the variable attenuator. According to embodiments, the reference optics further comprises a ball lens arranged adjacent to the optical fiber and the optical selector can be arranged between the ball lens of the reference optics and the ball lens adjacent the light detector by operating the variable attenuator. However use of a ball lens with the reference optics is optional. For example, an aperture can be provided instead of the ball lens while still achieving a satisfying functionality as the internal reference light usually has a sufficient intensity.

According to embodiments, the system further comprises a photo interrupter for detecting presence and absence of a position pin provided at the carrier of the variable attenuator, wherein the position pin and the photo interrupter are arranged such that the presence of the position pin indicates that the optical selector mounted to the variable attenuator is arranged in the beam path between the reference optics and the light detector. According to an alternative embodiment, absence of the position pin indicates that the optical selector is arranged in the beam path between the reference optics and the light detector. By use of such a photo interrupter a starting position of the variable attenuator can be found with high accuracy and at low costs. According to alternative embodiments, the position pin is formed in one piece with either the selector or the attenuating filter.

According to a further embodiment, a method of operating a distance-measuring system is provided, the method comprising taking a decision on a kind of target reflecting light towards the distance-measuring system, the kind of target comprising at least a target having low reflectivity and a target having high reflectivity, and adjusting transparency of an attenuating filter of the distance-measuring system in dependency on intensity of light received via the attenuating filter at a light detector of the distance-measuring system. Adjustment of transparency of the attenuating filter is started with the highest transparency of the attenuating filter if the kind of target identifies use of a target having low reflectivity. Furthermore, adjustment of transparency of the attenuating filter is started with the lowest transparency of the attenuating filter if the kind of target identifies use of a target having high reflectivity. In this way, an attenuation of the attenuating filter that is well adjusted to a respective kind target can be reached very quickly.

According to embodiments, the method further comprises the steps of identifying the kind of target to be used, directing light generated by the internal light source to the target to be measured, and receiving light reflected by the target at the light detector via the attenuating filter.

According to embodiments, transparency of the attenuating filter is gradually reduced during adjustment of transparency of the attenuating filter if the kind of target identifies use of a target having low reflectivity. Furthermore, transparency of the attenuating filter is gradually increased during adjustment of transparency of the attenuating filter if the kind of target identifies use of a target having high reflectivity.

According to embodiments, the kind of target to be used is determined by receiving a user input identifying a type of measurement to be performed. This input by a user comprises identification whether a cooperative target or non-cooperative target is to be used. According to an alternative embodiment, it is determined automatically whether a cooperative target or non-cooperative target is to be used, e.g. based on an intensity of light received from the target.

According to embodiments, the above method further comprises for example one or plural additional steps such as a step of calibrating a light detector by directly guiding light from the internal light source towards the light detector and detecting a phase difference between the light emitted by the light source and the light received by the light detector, or a step of detecting a phase difference between light directed to the target and reflected light received from the target to calculate a relative distance of the target.

Using the above-described distance measuring system, for example, can perform the above method.

According to a further embodiment, a surveying instrument comprising a housing and a mount supporting the housing is provided, wherein the housing comprises the above described distance-measuring system. According to embodiments, the surveying instrument further has a user interface for input of at least one of a type of measurement to be performed or a kind of target to be used by a user. The mount can for example be a tripod. The surveying instrument can for example be an electronic distance meter.

According to embodiments a distance-measuring system comprises a light source, a light detector, measuring optics, reference optics, a variable attenuator and an optical selector. The measuring optics are configured to project light emitted by the light source to a target to be measured and for guiding light reflected from said target towards the light detector. The reference optics are configured to direct light emitted by the light source within the system towards the light detector as internal reference light. The variable attenuator is configured to adjust intensity of light incident on the light detector and comprises an attenuating filter arranged in the beam path between the measuring optics and the light detector, and an actuator coupled to the attenuating filter for moving the attenuating filter. The optical selector is configured to selectively direct light guided by either the measuring optics or the reference optics to the light detector. According to embodiments, the optical selector is coupled to at least one of the actuator and the attenuating filter, and moved by the actuator together with the attenuating filter. According to embodiments, along the same direction of movement of the attenuating filter caused by the actuator the attenuating filter has first and second sections of varying transmissivity, a first section in which the transmissivity varies from higher transparency to lower transparency and a second section in which the transmissivity varies from higher transparency to lower transparency. According to embodiments, the variable attenuator further comprises a carrier supporting both the attenuating filter and the optical selector, wherein the carrier has a circular shape rotatable about a rotational shaft, and wherein the attenuating filter is part of a circumferential surface when supported by the carrier.

BRIEF DESCRIPTION OF THE DRAWINGS

The forgoing, as well as other advantageous features, will be more apparent from the following detailed description of exemplary embodiments of the invention with reference to the accompanying drawings. It is noted that not all possible embodiments of the present invention necessarily exhibit each and every, or any, of the advantages identified herein.

FIG. 3C shows an enlarged schematic cross sectional view of selected elements of FIG. 3A in a first operating state;

FIG. 3D shows an enlarged schematic cross sectional view of selected elements of FIG. 3A in a second operating state;

DETAILED DESCRIPTION OF THE INVENTION

Figure 1:
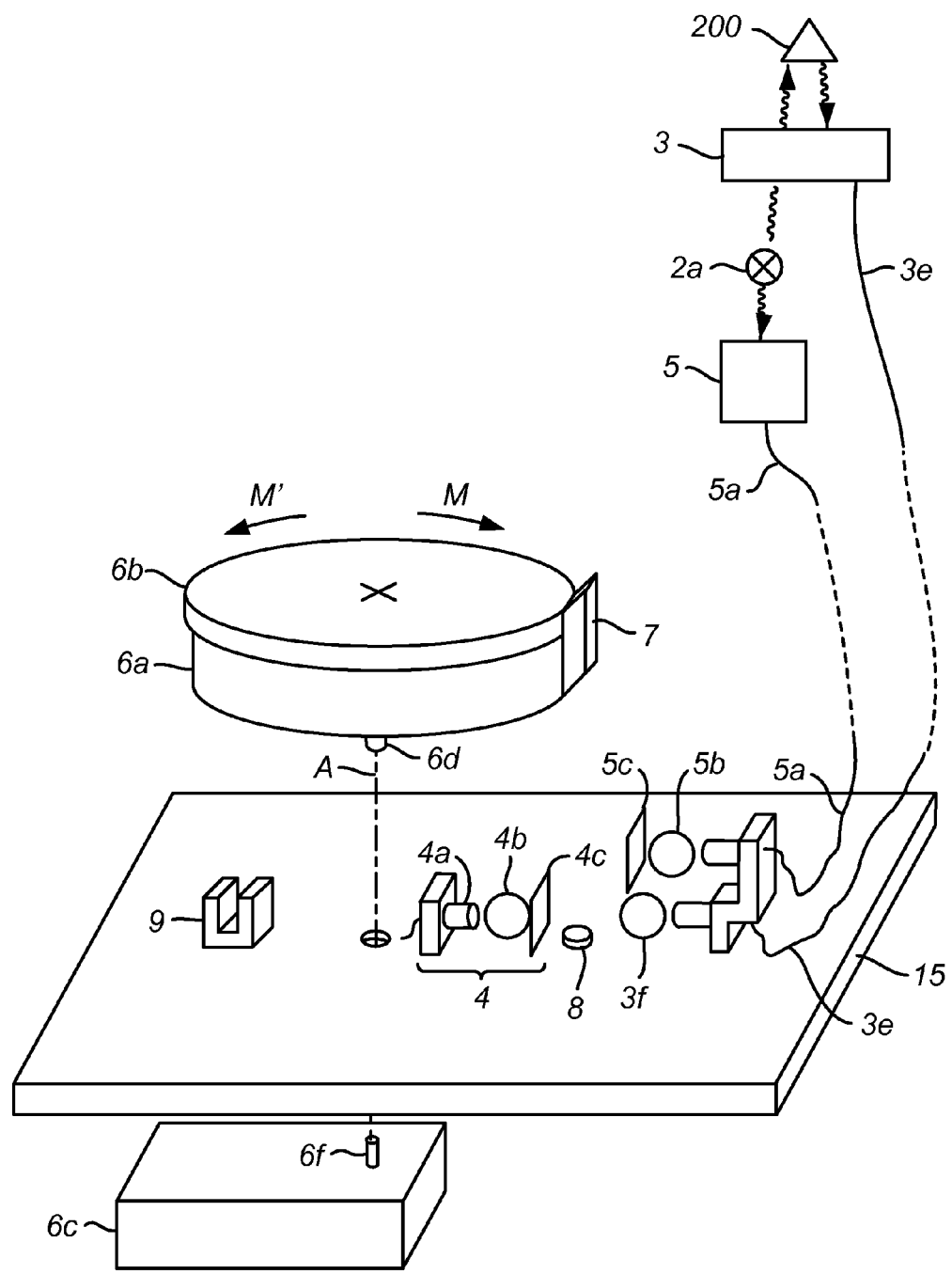
FIG. 1 shows a schematic partially exploded view of a distance measuring system according to a first embodiment.

In the exemplary embodiments described below, elements that are alike in function and structure are designated, as far as possible, by alike reference numerals. Therefore, to understand the features of the individual components of a specific embodiment, the descriptions of other embodiments and of the summary of the invention should be referred to.

In the drawings, elements that are functionally closely related to one another or are part of a generic unit are identified by the same numeral but distinguished by different characters. For example, in embodiments reference numerals 6a to 6g identify different elements of a variable attenuator 6, etc. Elements of different embodiments that are alike in function and structure but differ from one another are distinguished by asterisks.

A) First Embodiment (FIGS. 1, 1A-1E)

Figure 1A:
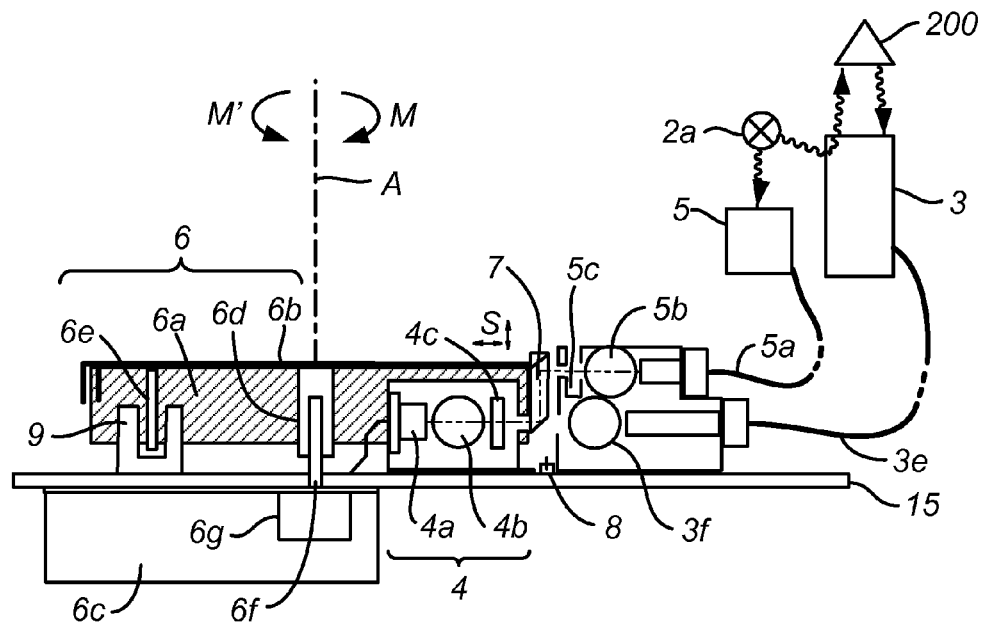
FIG. 1A shows a schematic cross sectional view of the distance measuring system according to the first embodiment.

FIGS. 1 and 1A to 1E schematically show different views of a distance measuring system according to a first embodiment in three different operating states. While FIGS. 1 and 1A schematically show the whole system, FIGS. 1B to 1E show selected elements thereof.

Figure 1B:
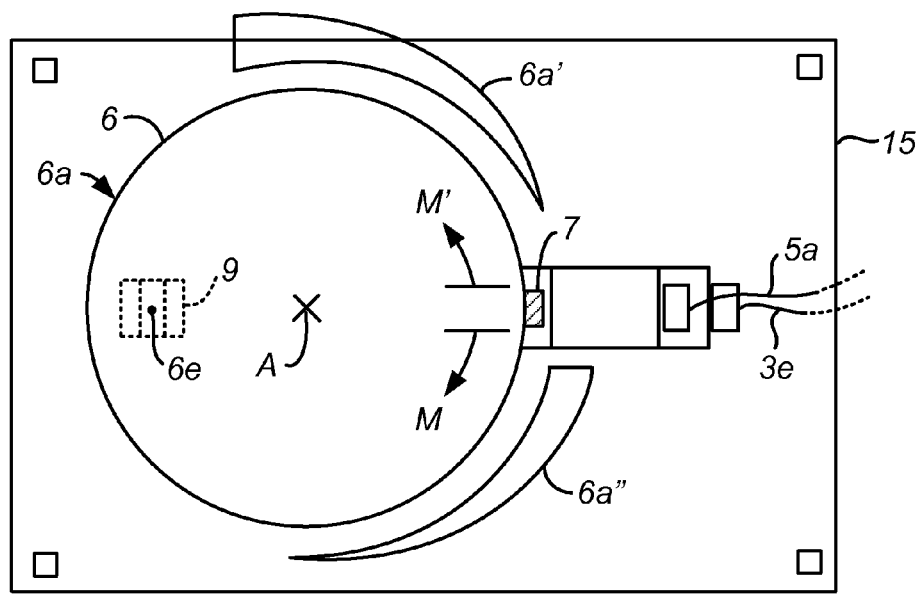
FIG. 1B shows a top view on selected elements of FIG. 1A.

FIG. 1 shows a schematic partially exploded view. FIGS. 1A, 1C, 1D and 1E each show schematic cross sectional views. FIG. 1B schematically shows a top view. In FIGS. 1 and 1A some elements are also drawn as symbols.

A1) Operating States Used in the First Embodiment

The different operating states are:

A11) A first operating state of calibrating a light detector 4a of a light receiver 4 of the distance measuring system by directly guiding light from an internal light source 2a via reference optics 5 towards the light detector 4a. This first operating state is shown in FIGS. 1, 1A, 1B and 1C.

A12) A second operating state of performing distance measurement with respect to a target 200 by directing light emitted by the internal light source 2a and reflected from the target 200 via measuring optics 3 towards the light detector 4a of the light receiver 4. FIG. 1D shows this second operating state.

A13) A third operating state of adjusting an optical fiber 3e of the measuring optics 3 by guiding adjustment light emitted by a second light source 8 towards the optical fiber 3e of the measuring optics 3. The third operating state is shown in FIG. 1E.

A2) General Structure of the Distance Measuring System According to the First Embodiment In the following, the general structure of the distance measuring system according to the first embodiment is described by referring to FIGS. 1 and 1A-1E.

The distance measuring system according to the first embodiment comprises a light source 2a, measuring optics 3, reference optics 5 and a receiving unit 15.

In the present embodiment, the light source 2a is a laser diode emitting light towards the measuring optics 3 and the reference optics 5. A suitable laser diode type HL6501MG is obtainable from Sasco Holz GmbH Berlin, Motardstrasse 54, 13629, Germany. However, the present invention is not restricted to use of laser diodes or laser light sources. Any other light source, e.g., a Light Emitting Diode for emitting visible light or infrared light, might be used. The light emitted by the light source can for example be modulated and especially comprise a carrier signal. However, even pulse modulated light can be used.

In the present embodiment, the measuring optics 3 project light emitted by the light source 2a to a target 200, the distance of which target 200 relative to the distance measuring system 15 is to be measured. The measuring optics 3 further direct light reflected from said target 200 towards a light detector 4a of the receiving unit 15.

In the present embodiment, the reference optics 5 direct light emitted by the light source 2a within the system towards the light detector 4a of the receiving unit 15 as internal reference light. Both the measuring optics 3 and the reference optics 5 will be described later in further detail by reference to FIG. 5. The measuring optics 3 and the reference optics 5 each can for example comprise several optical elements such as lenses, deflecting elements, filters and optical fibers.

In the first embodiment shown in FIG. 1A, the receiving unit 15 comprises a light receiver 4 comprising the light detector 4a, an optical selector 7 and a variable attenuator 6.

In the first embodiment, the light receiver 4 comprises a light detector 4a, a ball lens 4b and a filter 4c. The ball lens 4b is provided between the filter 4c and the light detector 4a. The light detector 4a can be any light sensitive element capable of sensing light, especially a semiconductor element. For example, the light detector can be a photodiode and especially an avalanche photodiode. A suitable light detector type AD230-8 TO52S1 is obtainable from Silicon Sensor GmbH, Ostendstrasse 1, 12459 Berlin, Germany. However, the present invention is not restricted to a light receiver 4 having the above structure. For example, ordinary lenses can be used instead of the ball lenses. Alternatively, at least one of the lens and the filter can be omitted.

In the present embodiment, the optical selector 7 is a rhomboid prism 7 having a first mirror surface 7a and a second mirror surface 7b, which cause a parallel displacement of beams of light entering and leaving the rhomboid prism 7. Thus, beams of light entering the rhomboid prism 7 and leaving the rhomboid prism 7 are substantially parallel. The first mirror-surface 7a can be arranged in an optical path of an optical fiber 5a (reference fiber) of the reference optics 5, and the second mirror surface 7b can be arranged at the same time in an optical path defined by the ball lens 4b of the light detector 4a. A suitable rhomboid prism can be obtained from Sinocera Photonics Inc., No. 355, PuHui Road, Jiading, Shanghai 201821, China. In the present embodiment, the rhomboid prism has the size 2 mm*2 mm*5 mm. However, the present invention is not restricted to these dimensions or the use of a rhomboid prism as optical selector 7. In the present embodiment, a housing 7d of the rhomboid prism 7 (beside a light incident surface and a light emerging surface located adjacent the first and second mirror surfaces 7a, 7b) is essentially opaque. Thus, in the present embodiment the housing 7d of the rhomboid prism 7 blocks light directed by the measuring optics 3 towards the light detector 4a when the distance measuring system is in the first operating state (i.e. the rhomboid prism 7 is located as shown in FIGS. 1 and 1A-1C, for example). However, light guided by the reference optics 5 can be incident on and emerge from the housing 7d of the rhomboid prism 7 via the light incident and emerging surfaces. In the present embodiment, the housing 7d is a separate element that is fixedly attached to the prism 7 and supported by the carrier 6b of the variable attenuator 6. However, according to an alternative embodiment a coating of the rhomboid prism (e.g. an opaque color) constitutes the housing, for example. According to a further alternative embodiment, the housing is formed in one piece with the carrier 6b of the variable attenuator 6. It is emphasized that the present invention is not restricted to a rhomboid prism having such a housing. In fact, the housing may even be omitted.

In the present embodiment, main components of the variable attenuator 6 are an attenuating filter 6a, a carrier 6b and an actuator 6c.

A neutral density filter is used as attenuating filter 6a in the present embodiment. According to an embodiment, a gray wedge filter is used as attenuating filter. However, the present invention is not restricted to a certain kind of attenuating filter. The attenuating filter will be described in further detail by reference to FIGS. 2A, 2B.

In the present embodiment, the carrier 6b is made of an opaque plastic material and has the shape of a disc. However, the present invention is not restricted to an opaque carrier 6b or plastic material. Moreover, the present invention is not restricted to a carrier having the shape of a disc. The carrier can for example have any circular shape and even the shape of a wheel. Further, the present invention is not restricted to a carrier having a circular shape. The carrier 6b is rotatable about a central rotational axis A by a rotational shaft 6d. The rotational shaft 6d is arranged in the center of the carrier 6b and coupled to a driving shaft 6f of the actuator 6c. The carrier 6b supports both the attenuating filter 6a and the optical selector 7. However, the carrier 6b and at least one of the attenuating filter 6a and optical selector 7 need not be separate elements but can be formed integrally in one piece, for example.

In the present embodiment, the actuator is a motor 6c and especially a stepper motor. The variable attenuator 6 is operated by rotating the rotational shaft 6d of the carrier 6b via the driving shaft 6f that is coupled to an internal gear 6g of the motor 6c. Consequently, the carrier 6b is rotated together with the attenuating filter 6a and the optical selector 7 about the rotational axis A. A suitable stepper motor can be obtained as type VID 29-05-03 from Data Instrumentation Technology Ltd, North Unit 4/f, H-2 Bld., East Industrial Park, Overseas Chinese Town, Shenzhen 518053, China. It is emphasized that the present invention is not restricted to a certain actuator or use of a stepper motor or a motor comprising an internal gear for operating the variable attenuator 6. A manual drive can for example be used as actuator instead of the motor.

As the carrier 6b supports both the attenuating filter 6a and the selector 7 at the same time, the attenuating filter 6a and the selector 7 are both rotated together with the carrier 6b about rotational axis A when the variable attenuator 6 is operated in response to operation of the motor 6c. Consequently, one single actuator is sufficient to displace both the attenuating filter 6a and the selector 7.

Figure 2A:
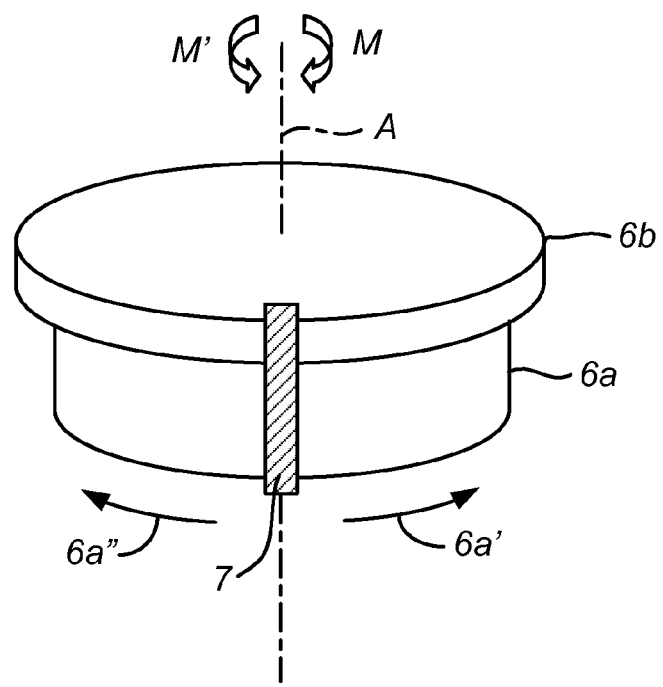
FIG. 2A schematically shows a perspective view on selected elements of a variable attenuator that is used in embodiments.
Figure 2B:
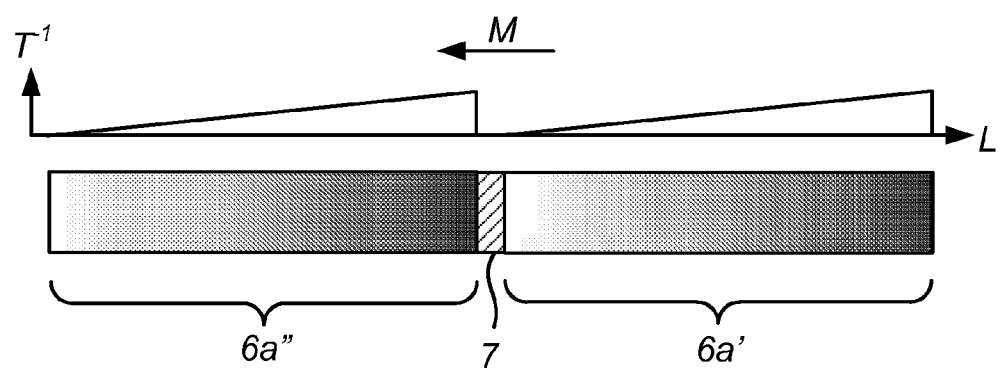
FIG. 2B schematically shows an attenuating filter and optical selector of the variable attenuator of FIG. 2A, which attenuating filter is unfolded in one plane.

Detailed Description of Attenuating Filter (FIGS. 2A, 2B)

The attenuating filter 6a and the carrier 6b supporting the same will now be explained in more detail by referring to FIGS. 2A and 2B. Afterwards description of the first embodiment will be resumed.

FIG. 2A schematically shows a perspective view of the carrier 6b supporting the attenuating filter 6a and the selector 7 used in the first and second embodiments.

The attenuating filter 6a is part of a circumferential cylinder-surface when supported by the carrier 6b. First and second sections 6a' and 6a" of the attenuating filter 6a extend in circumferential direction of the cylinder-surface. As can be seen from a comparison of FIGS. 1 and 1A to 1E with FIG. 2A, the attenuating filter 6a surrounds the light receiver 4 of the receiving unit 15 when mounted to the carrier 6b. This results in an especially compact structure of the receiving unit 15. In this respect it is emphasized that the present invention is not restricted to an attenuating filter defining a circumferential cylinder-surface. In fact, according to alternative embodiments the attenuating filter can for example define a frusto-conical surface or the surface of an annular ring or other circumferential surface surrounding the actuator or light receiver 4.

FIG. 2B schematically shows the attenuating filter 6a and selector 7 when unfolded in one plane. In FIG. 2B, the shaded areas symbolize the amount of attenuation 1/T ($T^{-1}$) and the white areas the amount of transparency T. This is further symbolized by the graph above the attenuating filter 6a. In this graph, the vertical y-axis indicates the amount of attenuation 1/T and the horizontal x-axis the length L of the unfolded attenuating filter 6a. When mounted to the carrier 6b as shown in FIG. 2A, the leftmost and rightmost portions of the unfolded attenuating filter 6a shown in FIG. 2B are joined together, thus forming an endless loop. In the present embodiment, the selector 7 is part of this endless loop.

As is shown in FIG. 2B, along the same direction of movement M of the attenuating filter 6a when mounted to the carrier 6b, the attenuating filter 6a has a first section 6a' in which the transmissivity varies from low transparency T (and thus high attenuation 1/T) to high transparency T (and thus low attenuation 1/T), and a second section 6a'' in which the transmissivity varies from low transparency to high transparency. Such attenuating filter can be manufactured in known ways for example by photochemistry or printing technologies. However, it is emphasized that the present invention is not restricted to an attenuating filter having the characteristics shown in FIG. 2B. For example, the transmissivity alternatively can vary from high transparency to low transparency in the two sections. Moreover, the attenuating filter can for example have more or less than two sections of varying transmissivity. In the present embodiment, the selector 7 is arranged between the two sections 6a' and 6a'' and thus between an area where the attenuating filter 6a has a highest transparency and an area where the attenuating filter 6a has a lowest transparency.

Description of the first embodiment is now resumed.

In the present embodiment, the varying transmissivity of the attenuating filter 6a is used to adapt the system to the intensity of light actually received by the light detector 4a of the light receiver 4. Intensity of light reflected from the target 200 and received by the light receiver 4 varies in dependency on a distance D (see FIG. 6) and kind of the target 200 (as either cooperative or non-cooperative targets can be used). Even air flickering, air humidity and the cleanliness of the air have some influence on the intensity of light received by the light receiver 4.

In the following, the function of the receiving unit 15 described above is explained in further detail.

A11) First Operating State of the First Embodiment

FIGS. 1, 1A, 1B and 1C show the first operating state. In the first operating state the selector 7 is arranged such that light emitted by the light source 2a is directly directed by the reference optics 5 via an optical fiber 5a, a ball lens 5b, a constant attenuating filter 5c, the first and second mirror surfaces 7a, 7b of the selector 7, the filter 4c and ball lens 4b towards the light detector 4a. By measuring intensity of light received by the light detector 4a calibration of the system is performed.

The constant attenuating filter 5c is provided after the ball lens 5b of the reference optics as the light emitted by the optical fiber 5a of the reference optics does not pass through the attenuating filter 6a to allow adaptation between a respective light source 2a and light detector 4a. In the present embodiment, the constant attenuating filter 5c adapts intensity of internal reference light directed by the reference optics 5 via the selector 7 towards the light detector 4a to an order of magnitude (scale) of intensity of light (reflected from the target 200) typically directed by the measuring optics 3 towards the light detector 4a. However, the constant attenuating filter 5c can even be omitted if adaptation between a respective light source 2a and light detector 4a is not necessary.

As the selector 7 causes a parallel displacement of the beams entering and leaving the selector 7, slackness S of the selector 7 occurring during rotation about the rotational shaft 6d of the carrier 6b does not deteriorate measurement accuracy.

In the first operating state light reflected from the target 200 and directed by the measuring optics 3 towards the light detector 4a does not reach the light detector 4a as it is blocked by the housing 7d of the selector 7.

A12) Second Operating State of the First Embodiment

The second operating state, where light reflected from the target 200 is directed by optical fiber 3e (receiving fiber) from measuring optics 3 through a ball lens 3f, the attenuating filter 6a, the filter 4c and ball lens 4b towards the light detector 4a, is shown in FIG. 1D. This operating state is the state in which the distance D of the target 200 from the system is actually measured.

Figure 1C:
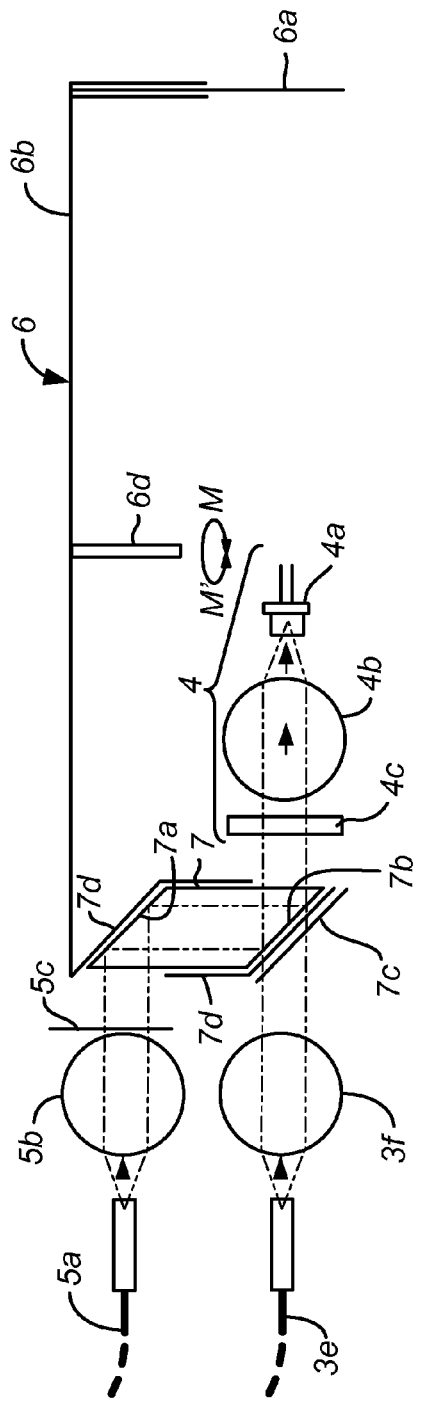
FIG. 1C shows an enlarged schematic cross sectional view of selected elements of FIG. 1A in a first operating state.
Figure 1D:
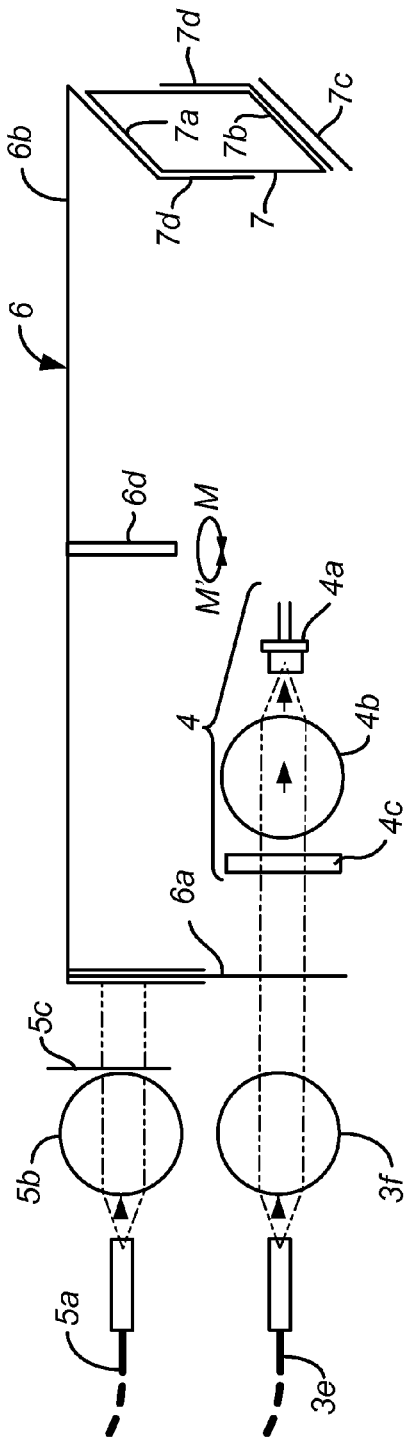
FIG. 1D shows an enlarged schematic cross sectional view of selected elements of FIG. 1A in a second operating state.
Figure 1E:
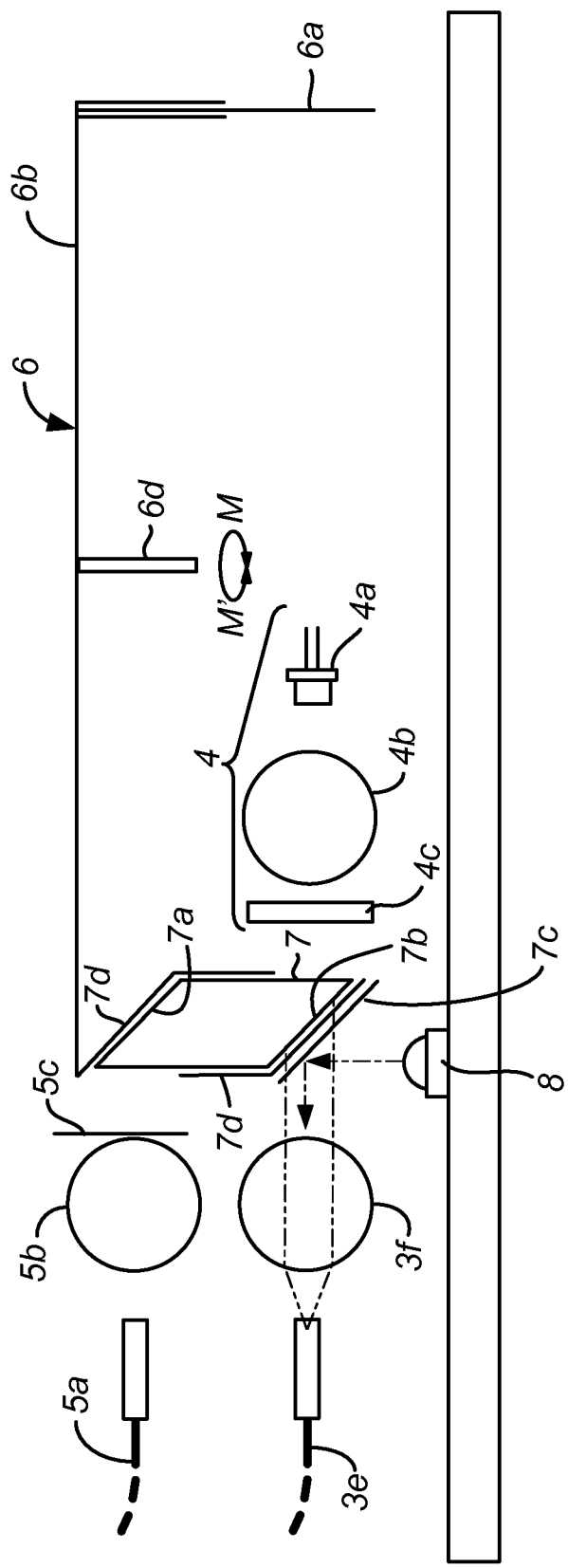
FIG. 1E shows an enlarged schematic cross sectional view of selected elements of FIG. 1A in a third operating state.

As can be seen from a comparison of FIGS. 1C and 1D, a beam path between the optical fiber 5a and the light detector 4a enters the circumferential cylinder-surface defined by the attenuating filter 6a in an area closer to the carrier 6b than a beam path between the optical fiber 3e and the light detector 4a. Thus, taking the carrier 6b as top of the receiving unit 15 and the light detector 4a as bottom of the receiving unit 15, the optical fiber 5a of the reference optics 5 is arranged above the optical fiber 3e of the measuring optics 3.

In the second operating state internal reference light directed by the reference optics 5 towards the light detector 4a does not reach the light detector 4a as it is blocked by the carrier 6b that is supporting both the variable attenuating filter 6a and the selector 7. Moreover, in the present embodiment an optical axis of the reference optics 5 is offset from an optical axis of the light receiver 4 comprising the light detector 4a if the selector 7 is not arranged in the optical path of the reference optics 5.

A13) Third Operating State of the First Embodiment

In the first embodiment, the system further comprises a second light source (e.g. a LED) 8 for emitting adjustment light having a wavelength that is observable by the human eye. A suitable second light source 8 is obtainable as SMD-LED type LSL29 from Sasco Holz GmbH Berlin, Motardstrasse 54, 13629, Germany. However, the present invention is not restricted to use of an LED as second light source. Any light source emitting visible light can be used, e.g. a lamp, bulb or laser.

As shown in FIG. 1E, adjustment light emitted by the second light source 8 is directed by an external mirror surface 7c provided on an outside of the selector 7 towards the optical fiber 3e (receiving fiber) if the selector 7 is in the same position as in the above described first operating state. This allows adjustment of the optical fiber 3e in an especially easy manner.

It is emphasized that the present invention is not restricted to a mirror surface 7c provided on the selector 7 to reflect light from the second light source 8 towards the optical fiber 3e. Alternatively, a reflecting surface other than a mirror surface and even a reflecting surface separate from the selector 7 may be used.

The second light source 8 need not be operated all the time or for each measurement, but only if adjustment of the optical fiber 3e of the measuring optics is to be performed. This is usually only necessary under exceptional circumstances (e.g. at manufacturing or at maintenance of the system).

In the present embodiment, in the third operating state the light source 2a is switched off. Thus, no internal reference light is directed by the reference optics 5 towards the light detector 4a. In consequence, also no light is reflected from the target 200 and directed by the measuring optics 3 towards the light detector 4a.

A3) Additional Features of the First Embodiment Relating to all Operating States Starting from the first operating state, calibration of the light detector 4a is performed by directing internal reference light to the light detector 4a and measuring intensity thereof. Afterwards, the motor 6c is controlled such that the carrier 6b, the attenuating filter 6a and the optical selector 7 are commonly rotated either in a clockwise direction M or anti-clockwise direction M' into the second operating state. When using the attenuating filter having varying transmissivity as described above with respect to FIGS. 2A and 2B, rotation in a clockwise direction is performed if a non-cooperative target is to be observed, whereas rotation in an anti-clockwise direction is performed when a cooperative target is to be observed. Thus, when a cooperative target is to be observed, the lowest transparency and thus highest degree of attenuation is used for starting measurement. On the other hand, when a non-cooperative target is to be observed, measurement is started by using a highest transparency and thus only a lowest degree of attenuation.

In the present embodiment, the ball lenses 3f and 5b are arranged neighboring the optical fibers 3e and 5a of the measuring optics 3 and the reference optics 5, respectively. Ball lens 4f is provided in front of the light detector 4a. The ball lenses 3f, 4b and 5b are used to provide a parallel beam of light which is favorable when the light is passing through the attenuating filter 6a, as shown in FIG. 1D, or the constant attenuating filter 5c, as shown in FIGS. 1A and 1C. Suitable ball lenses can be obtained from Sinocera Photonics Inc., No. 355, PuHui Road, Jiading, Shanghai 201821, China. In the present embodiment, the ball lenses have a diameter of 5 mm. However, the present invention is not restricted to these dimensions or the use of ball lenses.

As shown in FIGS. 1A and 1B, in the present embodiment a position pin 6e extending in parallel to the rotational axis A is provided on a bottom of the carrier 6b. A photo interrupter 9 can detect presence or absence of the position pin 6e at a certain position. In the embodiments, position pin 6e and the photo interrupter 9 are positioned such that the position pin 6e is detected by the photo interrupter 9 when the selector 7 is arranged in the beam path between the optical fiber 5a of the reference optics 5 and the light detector 4a. Thus, if the photo interrupter 9 detects presence of the position pin 6e, the system is in the first respectively third operating state described above and ready for calibration of the light detector 4a respectively adjustment of the receiving fiber 3e. The first operating state is a good starting point for measurement.

A suitable photo interrupter type CPI-210T is obtainable from Endrich Bauelemente Vertriebs GmbH, Hauptstrasse 56, 72202 Nagold, Germany. It is emphasized that use of the position pin and photo interrupter is only facultative. Alternatively, the position of the selector can, for example, be directly detected by the output of the motor, especially when the motor has a mechanical stop.

B) Second Embodiment (FIGS. 3A-3D)

FIGS. 3A to 3D schematically show different views of a distance measuring system according to a second embodiment in two different operating states.

Figure 3A:
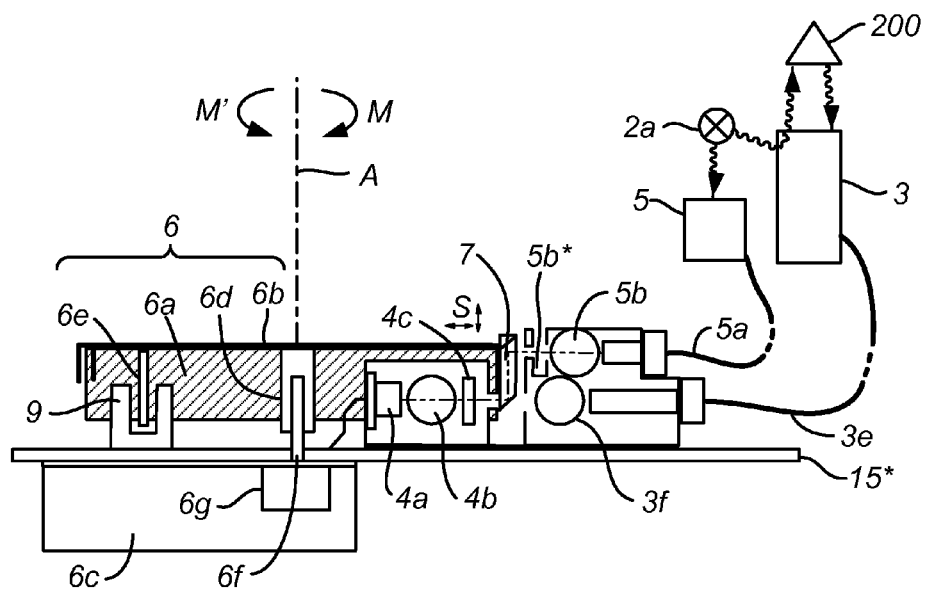
FIG. 3A shows a schematic cross sectional view of a distance measuring system according to a second embodiment.
Figure 3B:
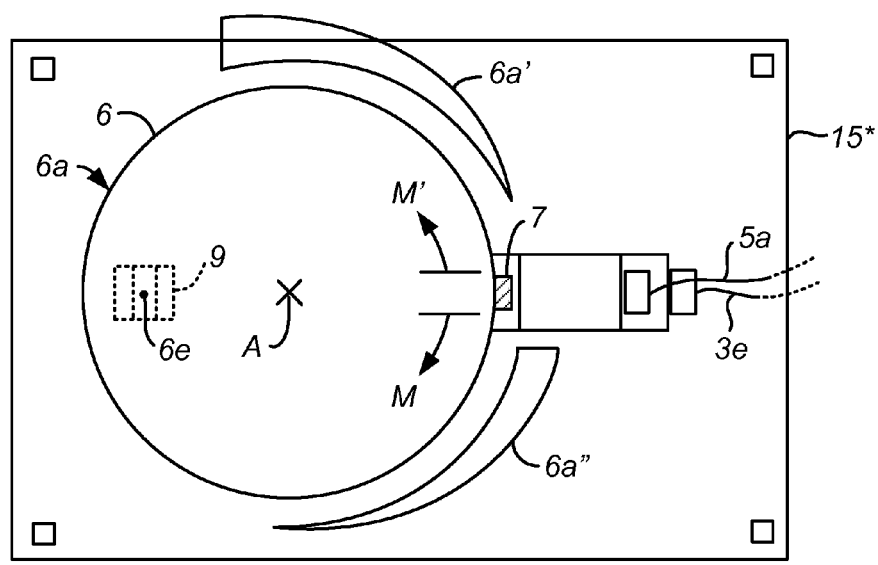
FIG. 3B shows a top view on selected elements of FIG. 3A.

FIGS. 3A, 3C and 3D each show schematic cross sectional views. FIG. 3B schematically shows a top view.

The different operating states are the first and second operating states described above with respect to the first embodiment. The first operating state is shown in FIGS. 3A, 3B and 3C whereas the second operating state is shown in FIG. 3D.

The structure and function of the receiving unit 15* of the second embodiment is very similar to the structure and function of the receiving unit 15 of the above-described first embodiment. Therefore description of the first embodiment is referred to.

In the first operating state shown in FIGS. 3A, 3B and 3C, light emitted by the light source 2a is directed by the reference optics 5 and the optical selector 7* towards the light detector 4a. This light is received by the light detector 4a as internal reference light. Light reflected from the target 200 and directed by the measuring optics 3 towards the light detector 4a is blocked by the carrier 6b supporting both the attenuating filter 6a and the optical selector 7*.

In the second operating state shown in FIG. 3D, light reflected from the target 200 and directed by the measuring optics 3 towards the light detector 4a is received by the light detector 4a via the attenuating filter 6a. The internal reference light directed by the reference optics 5 towards the light detector 4a is blocked by the carrier 6b of the variable attenuator 6.

The second embodiment basically differs from the first embodiment in that the ball lens 5b is replaced by an optical aperture 5b*. Such optical aperture 5b* provides sufficient accuracy if the intensity of light directed by the optical fiber 5a of the reference optics towards the light detector 4a is sufficiently high.

Moreover, in the second embodiment provision of a second light source 8 and an external mirror surface at the optical selector 7* is omitted. Furthermore, the rhomboid prism that is used as optical selector 7 in the first embodiment is replaced by an optical selector 7* comprising two parallel mirror surfaces 7a and 7b.

C) Third Embodiment (FIGS. 4A-4D)

Figure 4A:
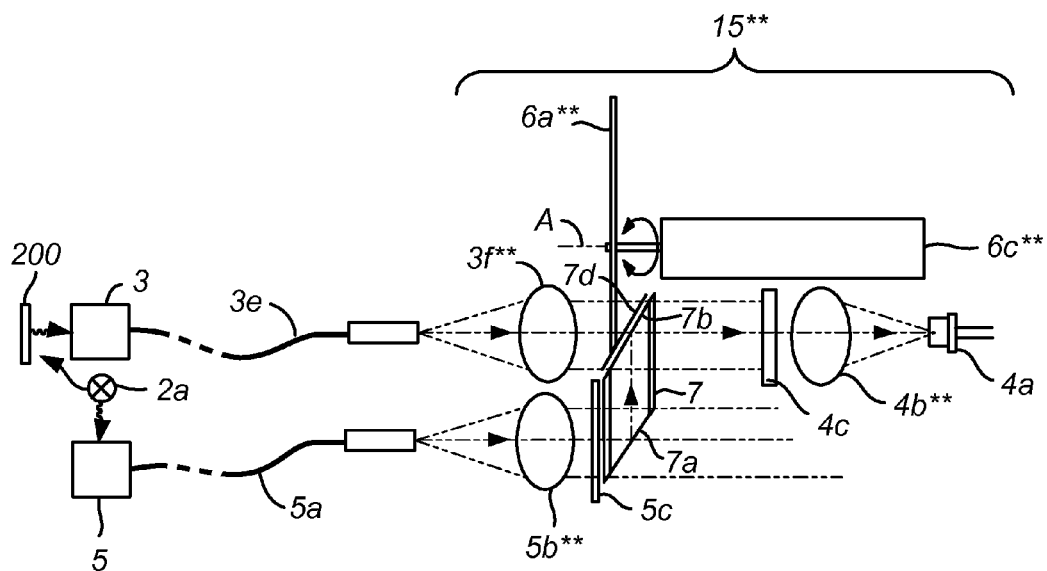
FIG. 4A shows a schematic cross sectional view of a distance measuring system according to a third embodiment in a first operating state.
Figure 4B:
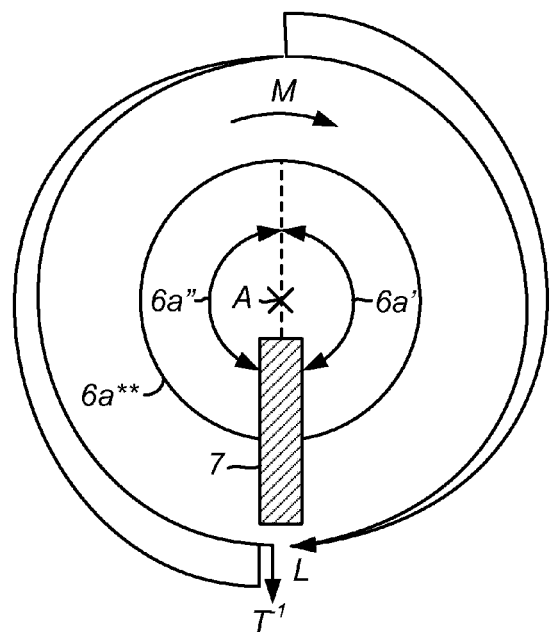
FIG. 4B schematically shows a front view of an attenuating filter and optical selector of a variable attenuator used in the embodiment of FIG. 4A in the first operating state.
Figure 4C:
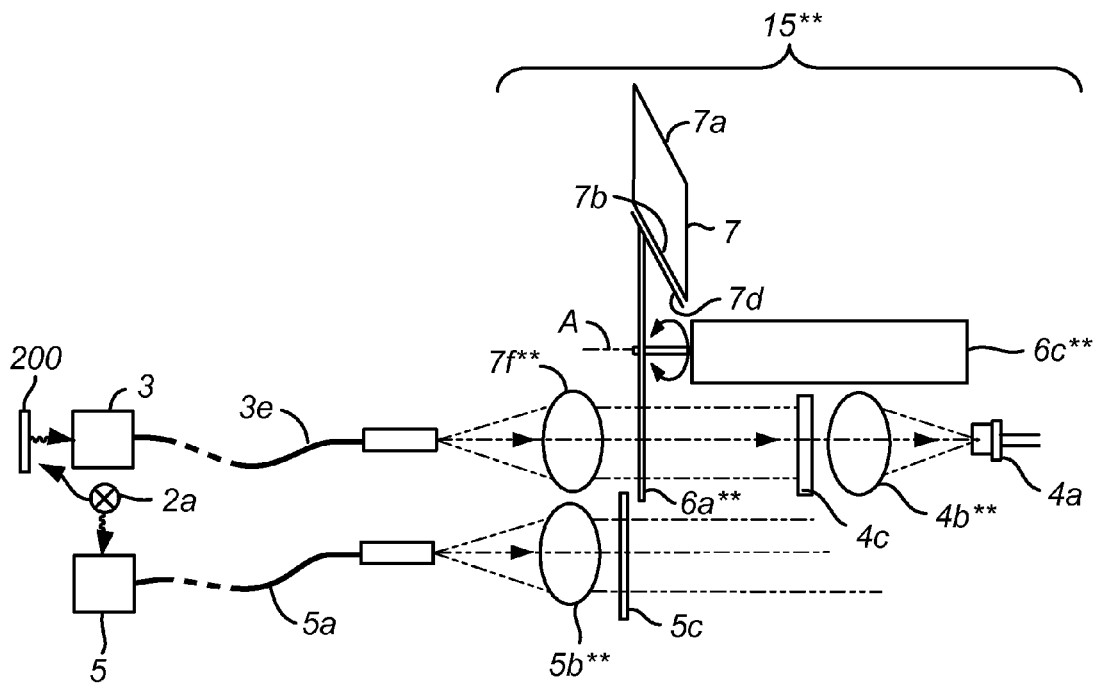
FIG. 4C shows a schematic cross sectional view of a distance measuring system of FIG. 4A in a second operating state.
Figure 4D:
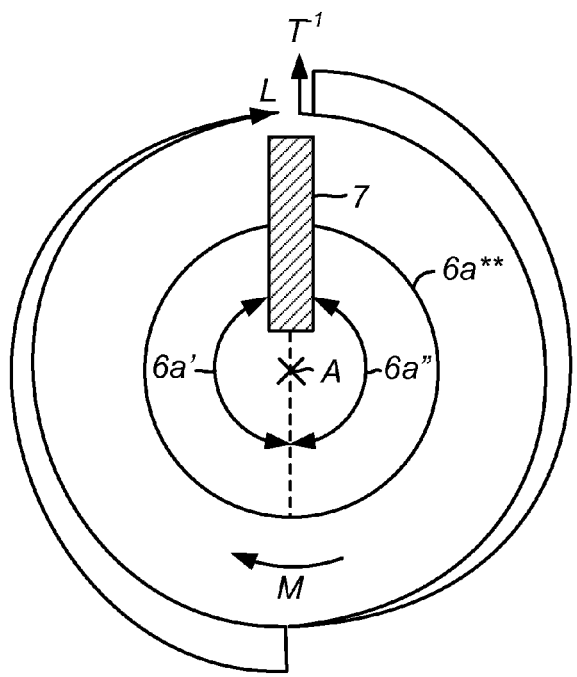
FIG. 4D schematically shows a front view of an attenuating filter and optical selector of a variable attenuator used in the embodiment of FIG. 4A in the second operating state.

FIGS. 4A and 4C schematically show cross sectional views of a distance measuring system according to a third embodiment in two different operating states. FIGS. 4B and 4D schematically show front views of an attenuating filter 6** used in the third embodiment.

The different operating states are the first and second operating states described above with respect to the first embodiment. The first operating state is shown in FIGS. 4A and 4B, and the second operating state is shown in FIGS. 4C and 4D.

The structure and function of the third embodiment is very similar to the above-described first embodiment. Therefore description of the first embodiment is referred to.

In the first operating state shown in FIGS. 4A and 4B, light emitted by the light source 2a is directed by the reference optics 5 and the optical selector 7 towards the light detector 4a. This light is received by the light detector 4a as internal reference light. Light reflected from the target 200 and directed by the measuring optics 3 towards the light detector 4a is blocked by the housing 7d of the optical selector 7. In the present embodiment, the housing 7d of the optical selector 7 is constituted by an external opaque coating layer of the second mirror surface 7b of the optical selector 7. To facilitate understanding FIGS. 4A and 4C, a gap is shown between elements 7b and 7d that in fact need not exist in the present embodiment. However, it is emphasized that the present invention is not restricted to such a kind of housing or an optical selector having a housing at all.

In the second operating state shown in FIGS. 4C and 4D, light reflected from the target 200 and directed by the measuring optics 3 towards the light detector 4a is received by the light detector 4a via the attenuating filter 6a. The internal reference light directed by the reference optics 5 towards the light detector 4a does not reach the light detector 4a as the optical axis of the reference optics 5 is offset from the optical axis of the light receiver 4 comprising the light detector 4a.

The third embodiment differs from the first embodiment in that the second light source 8 and an external mirror surface at the optical selector 7 are omitted.

Furthermore, in the third embodiment the carrier, attenuating filter and rotational shaft of the variable attenuator 6 are of one piece. Thus, the selector 7 is directly supported by the attenuating filter 6a.

According to the third embodiment, the attenuating filter 6a has the form of a flat disc. As symbolized by the graph in FIGS. 4B and 4D the attenuating filter 6a has two sections 6a', 6a" of varying transmissivity along a direction of movement M of the attenuating filter 6a**, wherein the transmissivity varies from lower transparency to higher transparency in both the first and second sections 6a', 6a". At a portion between the two sections 6a', 6", the optical selector 7 is mounted.

Moreover, in the third embodiment the ball lenses are replaced by ordinary lenses 3f*, 4b and 5b. Further, a motor 6c without internal gear is used as actuator for rotating the attenuating filter 6a.

Figure 5:
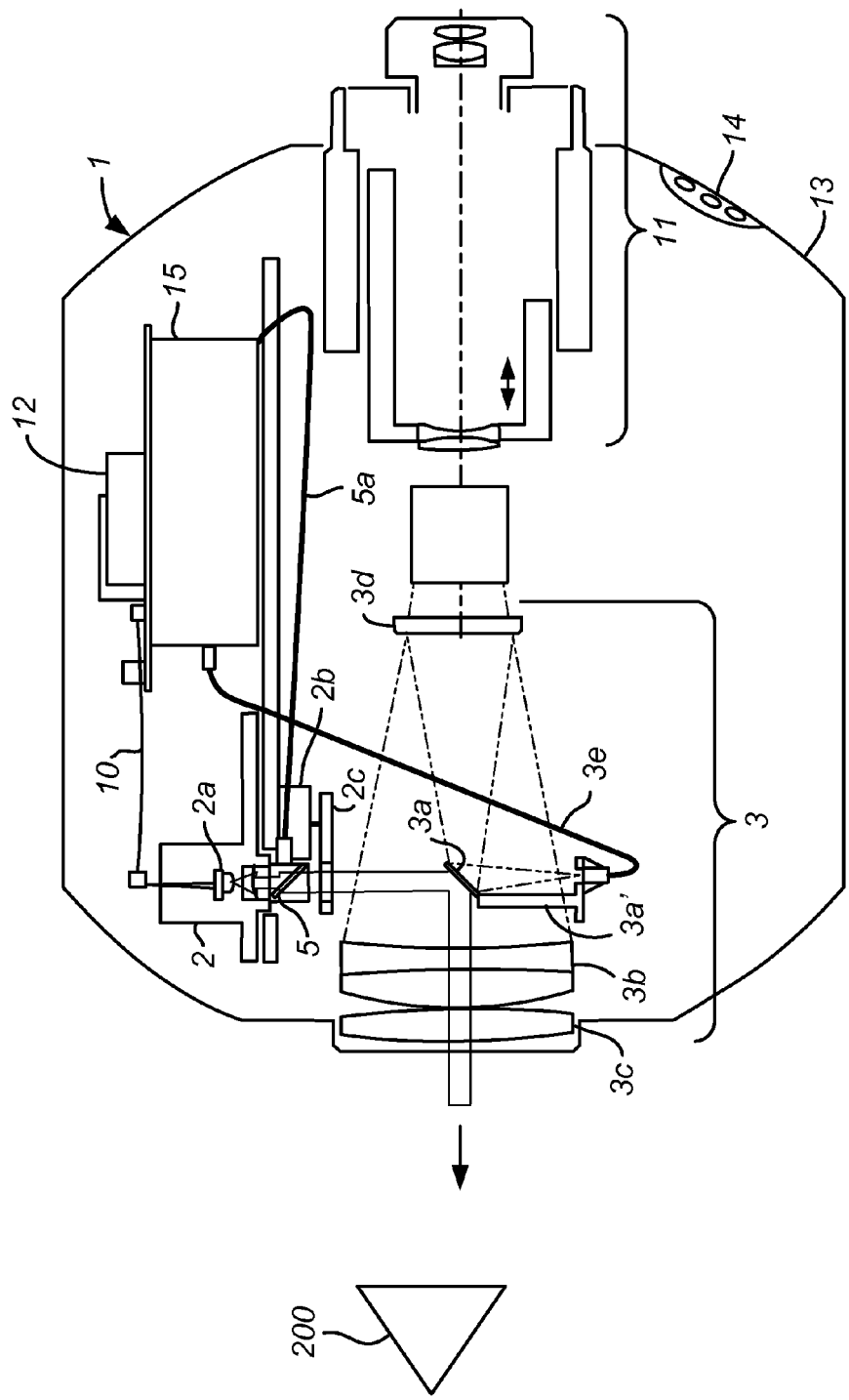
FIG. 5 is a schematic cross sectional view of a surveying instrument comprising the distance measuring system according to embodiments.

D) Surveying Instrument (FIG. 5)

FIG. 5 is a schematic cross-sectional view of a surveying instrument (e.g. a telescope unit) comprising the distance measuring system according to the above embodiments.

Figure 6:
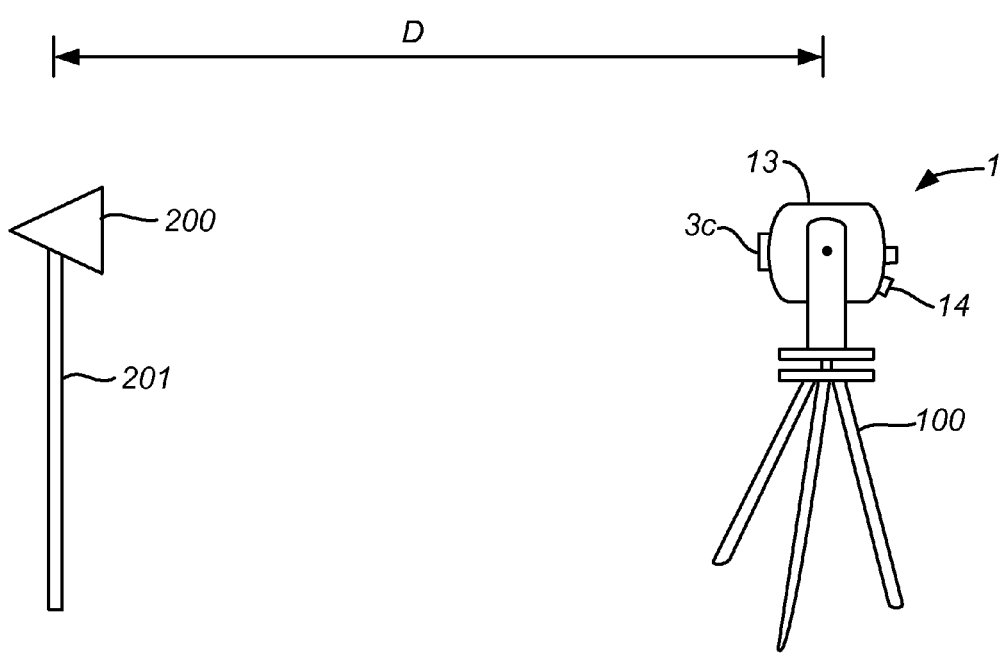
FIG. 6 schematically shows a side view on the surveying instrument of FIG. 5 in an operating state.

Such surveying instrument is frequently mounted on a tripod (as shown in FIG. 6).

The surveying instrument 1 comprises a transmitter unit 2 having the light source 2a. The transmitter unit 2 further comprises a light filter 2c coupled to a motor 2b. By using the motor 2b, the light filter 2c can be inserted or removed from a beam path defined by the light source 2a to adapt the system 1 to use of either a non-cooperative target or a cooperative target. It is emphasized that use of the light filter 2c and pertaining motor is only facultative.

The surveying instrument 1 further comprises the measuring optics 3 comprising a central mirror 3a, first and second lenses 3b and 3c, a semi-transparent mirror 3d and the optical fiber 3e (receiving fiber). However, the present invention is not restricted to measuring optics having such structure.

To measure the distance of the target 200 from the surveying instrument 1, light emitted by the light source 2a is projected through the first and second lenses 3b and 3c towards the target 200 by using the central mirror 3a. Light reflected by the target 200 is directed through the second lens 3c and the first lens 3b towards the semi-transparent mirror 3d. Part of the light is reflected by the semi-transparent mirror 3d and directed by the backside of the central mirror 3a into the optical fiber 3e. The position of the central mirror 3a can be adjusted by using a support 3a' to guarantee that part of the light reflected from the target 200 enters the optical fiber 3e of the measuring optics 3. The optical fiber 3e of the measuring optics 3 is connected to the receiving unit 15. The semi-transparent mirror 3d can for example have a wavelength-dependent reflectivity that is especially high for light emitted by the light source 2a.

By using direct observation optics 11, the target 200 can be observed by a user through the semitransparent mirror 3d and the first and second lenses 3b, 3c of the measuring optics 3. The direct observation optics 11 is not described in further detail, as it is well known for the skilled person.

Furthermore, the optical fiber 5a (reference fiber) and reference optics 5 (here a semitransparent mirror for reflecting part of the light emitted by the light source 2a) are provided to directly direct light from the light source 2a to the receiving unit 15 without exiting a housing 13 of the system 1. Thus, the optical fiber 5a of the reference optics provides an internal reference light to the receiving unit 15. The semitransparent mirror of the reference optics 5 has an inclination of 45° with respect to the direction of propagation of light emitted by the light source 2a.

The receiving unit 15 has the structure as explained in further detail in the above first to third embodiments.

A micro-controller 12 is part of the receiving unit and placed on the receiving unit 15. The micro-controller controls operation of both the receiving unit 15 and the transmitter unit 2 (and thus the light source 2a). To allow modulation of the radiation emitted by the light source 2a, the transmitter unit 2 is connected to the receiving unit 15 by a coaxial cable 10. By determining phase differences between the light emitted by the laser diode 2a of the transmitter unit 2 and the light received by the detector 4a of the receiving unit 15 the micro-controller 12 either performs calibration of the system (if the light is provided by the reference optics 5) or detects the distance D between the target 200 and the distance measuring system (if the light is reflected by the target 200).

Further, a user interface 14 is connected to the micro-controller 12 for input of a type of measurement to be performed. According to embodiments, this type of measurement includes information whether a cooperative or non-cooperative target is to be used. Alternatively, the surveying instrument can use the micro-controller 12 to automatically detect the kind of target (e.g. by detecting reflectivity of the target).

It is emphasized that the present invention is not restricted to a surveying instrument having the structure described above with respect to FIG. 5. In fact, some or all of the above described elements of the surveying instrument can be omitted or replaced by other elements. Further, additional elements can be provided.

E) Electronic Distance Meter (FIG. 6)

An electronic distance meter incorporating the distance-measuring system of the above embodiments is schematically shown in FIG. 6 to give an example for a surveying instrument incorporating the distance-measuring system in an operating condition.

In FIG. 6, the electronic distance meter comprises a housing 13 containing the above-described distance-measuring system 1. The housing 13 is supported by a tripod 100 for allowing alignment of the electronic distance meter to a target 200 by rotating the housing about two perpendicular rotational axes in a known way. The target 200 shown in FIG. 6 is a prism and thus a cooperative target supported by a rod 201.

However, the present invention is not restricted to electronic distance meters or usage of cooperative targets and especially prisms. Even non-cooperative targets can be used. Further, the present invention can be applied on any instrument and especially surveying instrument.

Figure 7A:
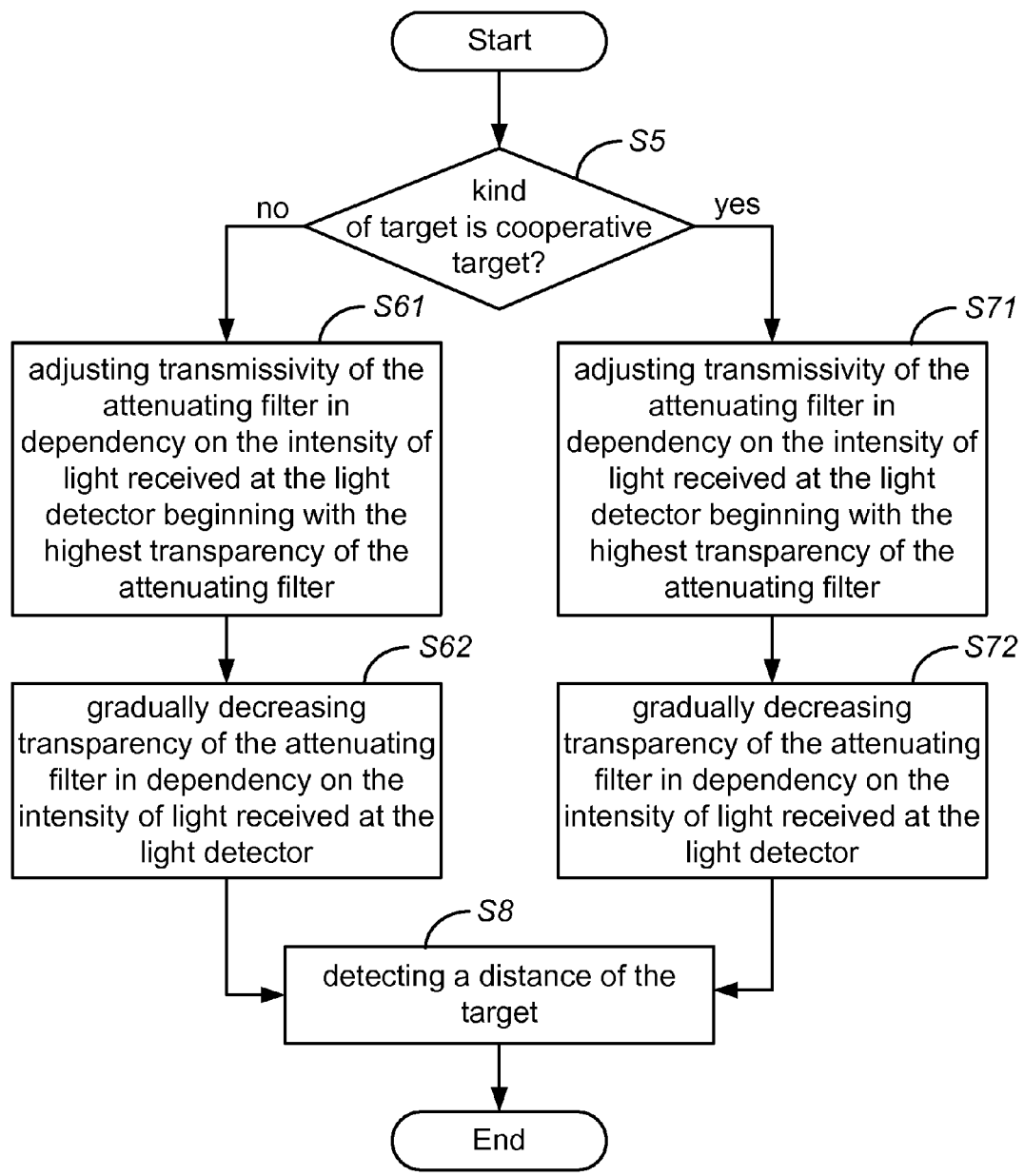
FIG. 7A shows a flow diagram of a method according to an embodiment.
Figure 7B:
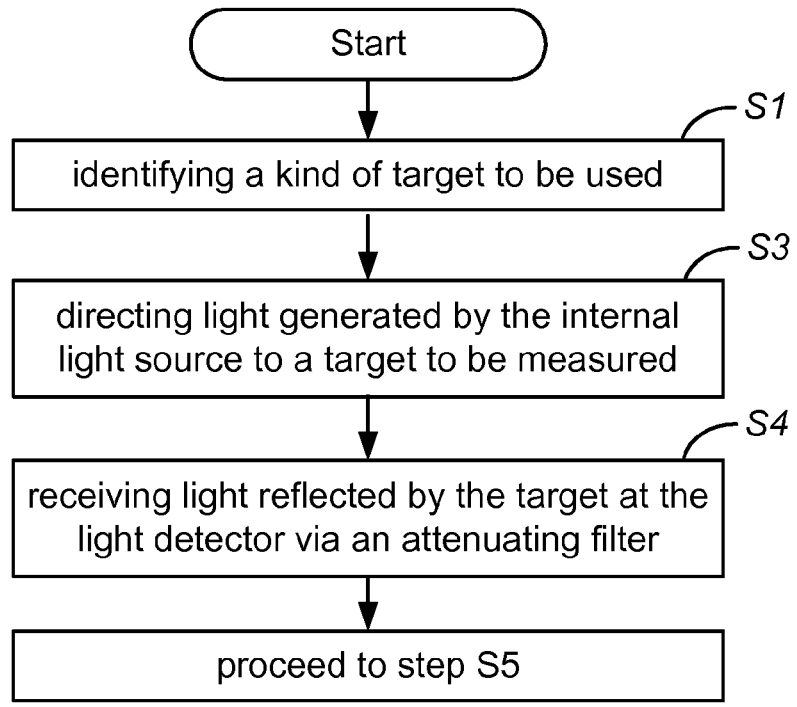
FIG. 7B shows a flow diagram of additional method steps that can be used in the method of FIG. 7A.
Figure 7C:
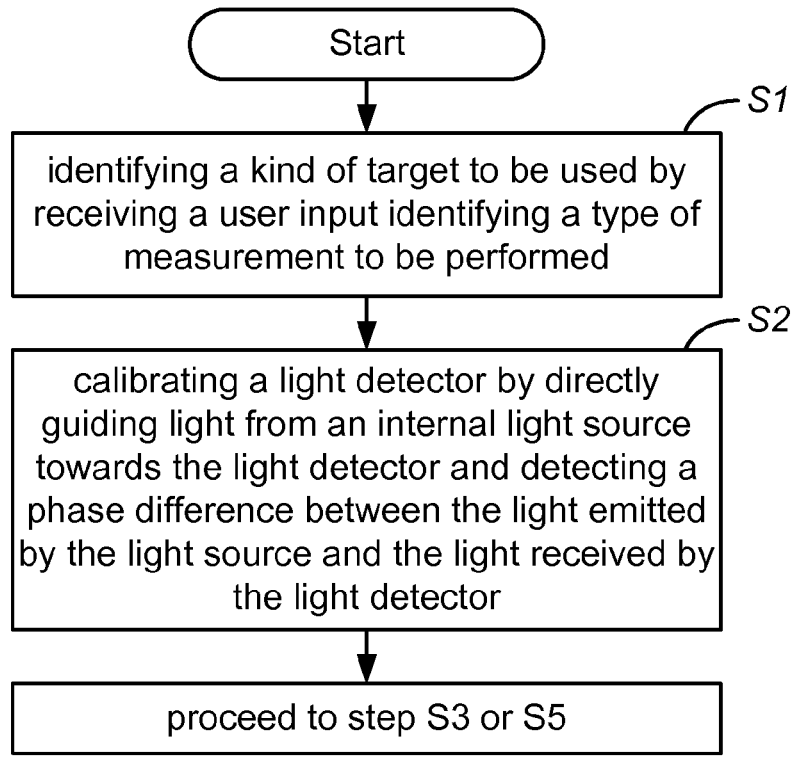
FIG. 7C shows a flow diagram of alternative or additional method steps that can be used in the method of FIG. 7B.

F) Method of Operating the Surveying Instrument (FIGS. 7A-7C)

In the following, embodiments of a method of operating the above surveying instrument are explained by referring to FIGS. 7A to 7C.

According to a first embodiment shown in FIG. 7A, in a first step S5 it is judged whether the kind of target is a cooperative target having high reflectivity or non-cooperative target having low reflectivity.

If a non-cooperative target is used, transmissivity of the attenuating filter is adjusted in step S61 beginning with the highest transparency of the attenuating filter and thus a low degree of attenuation. The transparency is gradually reduced in step S71 in dependency on the intensity of light received at the light detector.

Alternatively, if a cooperative target is used, transmissivity of the attenuating filter is adjusted in step S62 beginning with the lowest transparency of the attenuating filter and thus a high degree of attenuation. Afterwards, in step S72 the transparency of the attenuating filter is gradually increased in dependency on the intensity of light received at the light detector.

After the attenuating filter has been sufficiently adjusted to the intensity of light received by the light detector, in step S8 a distance of the target is detected before the method is terminated. Afterwards further measurements can be started.

According to a further embodiment, in step S8 a phase difference between the light directed to the target and the reflected light received from the target is detected to calculate the distance of the target.

According to a further embodiment, the method comprises the additional steps shown in FIG. 7B.

Thus, in the first step S1 a kind of target to be used is identified. The kind of target e.g. comprises a cooperative target and a non-cooperative target. Therefore, in embodiments the decision on the kind of target is already taken in step S1. Alternatively, the decision may only be taken after light reflected from the target is received at the light detector (this will be described later with respect to steps S3 and S4).

Afterwards, in step S3 light generated by an internal light source is directed to the target to be measured. This can be performed e.g. by using the above-described measuring optics.

Light reflected by the target is received nearly instantly in step S4 via an (especially variable) attenuating filter at a light detector e.g. by using the measuring optics before the method proceeds at step S5.

According to a further embodiment, the method comprises the alternative or additional steps shown in FIG. 7C.

Thus, in this embodiment the kind of target is identified in the first step S1 based on a user input identifying a type of measurement to be performed. Thus, this type of measurement comprises information whether a cooperative target or non-cooperative target is to be used.

In a second step S2, the light detector is calibrated by directly guiding light from an internal light source towards the light detector. Thus, the system is brought into the first operating state described above where the optical selector directs internal reference light to the light detector. Afterwards, in the following step S3 the above-described second operating state is entered and the method is resumed as described above. Alternatively, the method can also proceed directly with step S5.

It is an advantage of the proposed system that it has an especially compact structure and can be manufactured at low manufacturing costs while high accuracy is maintained. It is an advantage of the proposed method that a suitable attenuation can be reached especially fast.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes can be made without departing from the spirit and scope of the present invention as defined in the following claims.

What is claimed is:

1. A distance-measuring system, comprising:
a light source;
a light detector;
measuring optics for projecting light emitted by the light source to a target and for guiding light reflected from said target towards the light detector;
a variable attenuator for adjusting intensity of light incident on the light detector, the variable attenuator comprising an attenuating filter arranged in a beam path between the measuring optics and the light detector, and an actuator coupled to the attenuating filter for moving the attenuating filter; and
a controller;
wherein along the same direction of movement of the attenuating filter caused by the actuator and within the beam path between the measuring optics and the light detector, the attenuating filter has first and second sections of varying transmissivity, a first section in which the transmissivity varies from higher transparency to lower transparency and a second section in which the transmissivity varies from higher transparency to lower transparency; and
wherein the controller is adapted to take a decision on a kind of the target reflecting light towards the light detector, the kind of target comprising a target having low reflectivity and a target having high reflectivity, and to control the actuator in dependency on the kind of target such that the attenuating filter is either moved in a first direction of movement or in a second direction of movement opposite to the first direction of movement.

2. The system according to claim 1, further comprising:
reference optics for guiding light emitted by the light source within the system towards the light detector as internal reference light; and
an optical selector for selectively directing light guided by either the measuring optics or the reference optics to the light detector; and wherein the optical selector is coupled to at least one of the actuator or the attenuating filter and moved by the actuator together with the attenuating filter.

3. The system according to claim 2,
wherein the variable attenuator further comprises a carrier supporting both the attenuating filter and the optical selector; and
wherein the actuator is coupled to the carrier for moving the carrier together with the attenuating filter and the optical selector.

4. The system according to claim 3, wherein the optical selector is arranged between the first and second sections of the attenuating filter.

5. The system according to claim 3,
wherein the carrier has a circular shape rotatable about a rotational shaft, the rotational shaft being arranged at a center of the carrier and being coupled to the actuator for rotating the carrier; and
wherein the attenuating filter is part of a cylinder-surface or frusto-conical surface or the surface of an annular ring when supported by the carrier, the first and second sections of the attenuating filter extending in circumferential direction of the cylinder-surface or frusto-conical surface or the surface of an annular ring.

6. The system according to claim 1, further comprising a ball lens arranged adjacent the light detector.

7. A distance-measuring system, comprising:
a light source;
a light detector;
measuring optics for projecting light emitted by the light source to a target to be measured and for guiding light reflected from said target towards the light detector; and
a variable attenuator for adjusting intensity of light incident on the light detector, the variable attenuator comprising an attenuating filter arranged in a beam path between the measuring optics and the light detector, a carrier supporting the attenuating filter, and an actuator coupled to the carrier for moving the carrier together with the attenuating filter;
wherein the carrier has a circular shape rotatable about a rotational shaft, the rotational shaft being arranged at a center of the carrier and being coupled to the actuator for rotating the carrier; and
wherein the attenuating filter has a cylinder shape, a frusto-conical shape, or an annular ring shape, and the light detector is arranged within a cavity formed by the cylinder shape, the frusto-conical shape, or the annular ring shape.

8. The system according to claim 7, further comprising:
reference optics for guiding light emitted by the light source within the system towards the light detector as internal reference light; and
an optical selector for selectively directing light guided by either the measuring optics or the reference optics to the light detector, wherein the optical selector is coupled to at least one of the actuator or the attenuating filter and moved by the actuator together with the attenuating filter.

9. The system according to claim 8, wherein the optical selector is supported by the carrier of the variable attenuator together with the attenuating filter and moved by the actuator together with the carrier.

10. The system according to claim 7, wherein along the same direction of movement of the attenuating filter caused by the actuator the attenuating filter has first and second sections of varying transmissivity, a first section in which the transmissivity varies from higher transparency to lower transparency and a second section in which the transmissivity varies from higher transparency to lower transparency, the first and second sections extending in circumferential direction of the cylinder shape, the frusto-conical shape, or the annular ring shape defined by the attenuating filter.

11. The system according to claim 7, wherein a beam path between the reference optics and the light detector enters the attenuating filter in an area closer to the carrier of the variable attenuator than a beam path between the measuring optics and the light detector.

12. The system according to claim 7, further comprising a ball lens arranged adjacent the light detector.

13. The system according to claim 1, further comprising:
a housing; and
a mount supporting the housing, wherein the light source, the light detector, the measuring optics, and the variable attenuator are disposed with the housing.

14. The system according to claim 7, further comprising:
a housing; and
a mount supporting the housing, wherein the light source, the light detector, the measuring optics, and the variable attenuator are disposed with the housing.

* * * * *